J. FARMER.
VISE.
APPLICATION FILED FEB. 1, 1913.
1,096,026.
Patented May 12, 1914.
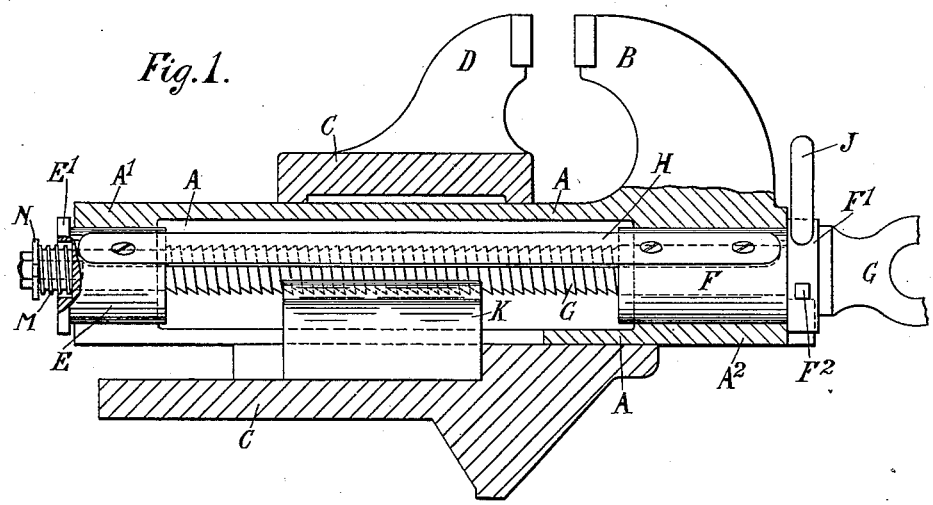
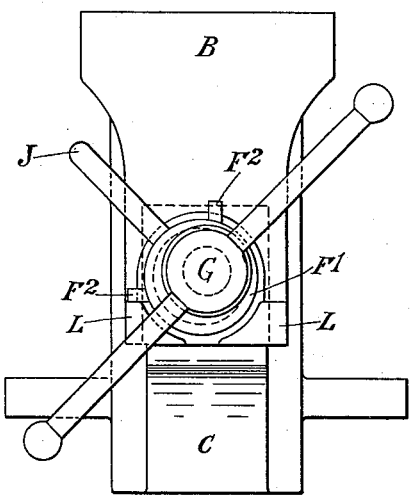
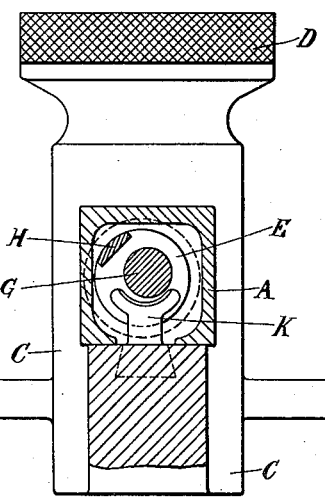

UNITED STATES PATENT OFFICE.

JAMES FARMER, OF NOTTINGHAM, ENGLAND.

VISE.

1,096,026.   Specification of Letters Patent.   Patented May 12, 1914.

Application filed February 1, 1913. Serial No. 745,621.

*To all whom it may concern:*

Be it known that I, JAMES FARMER, a subject of the King of Great Britain, and a resident of Nottingham, in England, have invented a certain new and useful Improvement in Vises, of which the following is a specification.

This invention relates to improvements in vises of the parallel quick action type, in which the screw and nut can be put into and out of engagement with each other.

Referring to the drawings, Figure 1 is a sectional side elevation. Fig. 2 an end elevation, and Fig. 3 a vertical cross section of a vise constructed according to my invention.

Like letters indicate like parts throughout the drawings.

According to the present invention, the hollow stem A of the movable jaw B, which slides in an opening in the main part C of the vise below the fixed jaw D as usual, is provided at its respective ends with bearings $A^1$ $A^2$, in which are mounted bearing sleeves E, F, preferably provided with external collars $E^1$, $F^1$, to take bearings on the rear and front ends of the stem A respectively. The bearing sleeves E and F described, are provided with bearings to receive the ends of the main screw G, and these screw bearings are eccentric with the outer bearing surface of each of said sleeves. The bearing sleeves E and F described, are further connected one to the other by means of a bar H running parallel to the screw G, so that by means of a handle J projecting from the collar $F^1$ on the front sleeve F, both may be turned simultaneously, and the main screw G be thus bodily raised and lowered relatively to the stem A in which it is situated, owing to the eccentricity of the screw in the said bearing sleeves E and F. This rising and falling movement of the screw G, carries it into and out of engagement with the nut K, which is in this case fixed, instead of being movable relatively to a fixed screw as is more usual. The underside of the hollow stem A is as usual provided with a longitudinal opening to admit the nut K, which latter is rigidly secured by any suitable means to the base of the main part C, and is provided on its upper face with a semi-circular recess, having a screw thread corresponding to that on the main screw G, which may be of the well known buttress shape. By turning the bearing sleeves E F in which the main screw G is mounted, it is readily moved into and out of engagement with the fixed nut K. If preferred, the bearing sleeves E and F in which the screw G is mounted, may have a frictional grip on the latter, so that the act of turning the screw G turns the bearing sleeves, and by arranging the parts as shown with a right hand threaded screw, the action is rendered automatic, the engagement of screw and nut being effected when the vise is screwed up, and the disengagement when it is unscrewed. The angular movement of the bearing sleeves E and F, may be limited by projecting studs or pins $F^2$ on the collar $F^1$ of the front bearing sleeve F, and stops L on the front end of the stem A as shown. By changing the position of the studs or projection $F^2$, adjustment is provided for taking up the wear of the screw and nut.

In order that the screw G may under all circumstances engage freely with the nut, the bearing sleeves E and F in the stem A of the movable jaw, are connected one to the other by the bar H so as to allow them a certain amount of end play, which permits of a corresponding movement of the main screw G which they carry. If desirable this end play may be taken up by a spring acting on one of the sleeve bearings, or as shown, a spring M (see Fig. 1) may be introduced between the outer end of the rear bearing sleeve E, and a nut or collar N on the rear end of the screw, so as to allow the necessary endwise movement of the screw G.

What I claim as my invention and desire to cover by Letters Patent is:—

1. In a vise, the combination, with the stem of a movable jaw, said stem having bearings at its opposite end portions, of a support for the locking screw journaled in the said bearings and provided with eccentric bearings at its end portions, a locking screw having its end portions journaled in the eccentric bearings of the said support, a stationary locking nut carried by the base, and means for oscillating the said support by hand to move the locking screw into and out of engagement with the locking nut.

2. In a vise, the combination with the stem of the movable jaw, of bearing sleeves in its respective ends provided with eccentric bearings, a bar for connecting said bearing sleeves, a fixed nut attached to the base, and means for angularly adjusting the bearing sleeves, so as to move the screw into and out of engagement with the fixed nut, substantially as described.

In testimony whereof I have signed my name to this specification in the presence of two subscribing witnesses.

JAMES FARMER.

Witnesses:
H. C. SHELDON,
J. B. JAMSON.

Copies of this patent may be obtained for five cents each, by addressing the "Commissioner of Patents, Washington, D. C."